US012089144B2

United States Patent
Tomizu et al.

(10) Patent No.: US 12,089,144 B2
(45) Date of Patent: Sep. 10, 2024

(54) RADIO COMMUNICATION APPARATUS AND METHOD

(71) Applicant: KYOCERA Corporation, Kyoto (JP)

(72) Inventors: Makoto Tomizu, Yokohama (JP);
Hiroki Shiiba, Yokohama (JP);
Kazunori Kojima, Yokohama (JP);
Masahiro Yagi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 392 days.

(21) Appl. No.: 17/559,165

(22) Filed: Dec. 22, 2021

(65) Prior Publication Data

US 2022/0116861 A1    Apr. 14, 2022

Related U.S. Application Data

(63) Continuation of application No. PCT/JP2020/024710, filed on Jun. 24, 2020.

(30) Foreign Application Priority Data

Jun. 26, 2019  (JP) ................................ 2019-119149
Jun. 26, 2019  (JP) ................................ 2019-119157

(51) Int. Cl.
*H04W 48/16*    (2009.01)
(52) U.S. Cl.
CPC .................................. *H04W 48/16* (2013.01)
(58) Field of Classification Search
CPC ................................................... H04W 48/16
See application file for complete search history.

(56) References Cited

U.S. PATENT DOCUMENTS

2015/0026317 A1*    1/2015 Ilsar ...................... H04W 24/02
                                                                 709/221

FOREIGN PATENT DOCUMENTS

| JP | 2006-238090 A | 9/2006 |
| JP | 2006-246121 A | 9/2006 |
| JP | 2007-295317 A | 11/2007 |
| JP | 2008-227580 A | 9/2008 |

OTHER PUBLICATIONS

3rd Generation Partnership Project; Technical Specification Group Core Network and Terminals; Non-Access-Stratum (NAS) functions related to Mobile Station (MS) in idle mode; 3GPP TS 23.122 V15.5.0, Sep. 2018; pp. 1-62; Valbonne, FRANCE.

* cited by examiner

*Primary Examiner* — Diane D Mizrahi
(74) *Attorney, Agent, or Firm* — Studebaker & Brackett PC

(57) ABSTRACT

A radio communication apparatus includes a communicator, and a controller configured to perform, in a case where search auxiliary information used to search for a base station used as a connection destination is stored, a first base station search based on the search auxiliary information. The controller is configured to perform a second base station search on all frequencies supported by the communicator in a case of failure in the first base station search or in a case where the search auxiliary information is not stored. The controller is configured to determine whether to store base station information related to the base station used as a connection destination, as the search auxiliary information, based on a movement state of the radio communication apparatus when location registration is performed via the base station used as the connection destination.

12 Claims, 9 Drawing Sheets

RADIO COMMUNICATION APPARATUS AND METHOD

RELATED APPLICATIONS

The present application is a continuation based on PCT Application No. PCT/JP2020/024710, filed on Jun. 24, 2020, which claims the benefit of Japanese Patent Applications No. 2019-119157 filed on Jun. 26, 2019, and No. 2019-119149 filed on Jun. 26, 2019. The content of which is incorporated by reference herein in their entirety.

TECHNICAL FIELD

The present invention relates to a radio communication apparatus and a method.

BACKGROUND ART

In response to power on or recovery to an in-service state, a radio communication apparatus needs to determine an appropriate base station as a connection destination by a base station search and to perform location registration with the network via the base station. After the location registration, the radio communication apparatus stores base station information related to the base station during the location registration (such as frequencies used by the base station) as search auxiliary information for the next base station search (NPL 1).

According to NPL 1, the radio communication apparatus checks during the base station search whether the search auxiliary information is stored, and first performs a limited base station search (hereinafter referred to as a "first base station search") based on the search auxiliary information.

In a case where the search auxiliary information is not stored or the first base station search fails, the radio communication apparatus performs a base station search (hereinafter referred to as a "second base station search") on all frequencies supported by the radio communication apparatus.

Typically, the radio communication apparatus is likely to exist in an area around an identical base station for an extended period of time because location environments (such as a geographic location) do not change frequently. Thus, since the first base station search is likely to be successful, the second base station search need not be performed, and the appropriate base station can be efficiently and quickly discovered.

CITATION LIST

Non-Patent Literature

NPL 1: 3GPP Technical Specification "3GPP TS 23.122 V15.5.0", September 2018

SUMMARY

A radio communication apparatus according to a first aspect includes a communicator and a controller configured to perform, in a case where search auxiliary information used to search for a base station used as a connection destination is stored, a first base station search based on the search auxiliary information. The controller is configured to perform a second base station search on all frequencies supported by the communicator in a case of failure in the first base station search or in a case where the search auxiliary information is not stored. The controller is configured to determine whether to store base station information related to the base station used as a connection destination, as the search auxiliary information, based on a movement state of the radio communication apparatus when location registration is performed via the base station used as the connection destination.

A method according to a second aspect is performed by the radio communication apparatus. The method includes performing, in a case where search auxiliary information used to search for a base station used as a connection destination is stored, a first base station search based on the search auxiliary information, performing, in a case of failure in the first base station search or in a case where the search auxiliary information is not stored, a second base station search on all frequencies supported by the communicator, and determining whether to store base station information related to the base station used as a connection destination, as the search auxiliary information based on a movement state of the radio communication apparatus when location registration is performed via the base station used as the connection destination.

A radio communication apparatus according to a third aspect includes a communicator and a controller configured to perform, in a case where search auxiliary information used to search for a base station used as a connection destination is stored, a first base station search based on the search auxiliary information. The controller is configured to perform a second base station search on all frequencies supported by the communicator in a case of failure in the first base station search or in a case where the search auxiliary information is not stored. The controller is configured to store, as the search auxiliary information, base station information related to the base station used as a connection destination when location registration is performed via the base station used as the connection destination. The controller is configured to determine whether to delete the stored search auxiliary information based on a movement state of the radio communication apparatus.

A method according to a fourth aspect is performed in a radio communication apparatus. The method includes performing, in a case where search auxiliary information used to search for a base station used as a connection destination is stored, a first base station search based on the search auxiliary information, performing, in a case of failure in the first base station search or in a case where the search auxiliary information is not stored, a second base station search on all frequencies supported by the communicator, storing, as the search auxiliary information, base station information related to the base station used as the connection destination when performing location registration via the base station used as a connection destination, and determining whether to delete the stored search auxiliary information based on a movement state of the radio communication apparatus.

DESCRIPTION OF EMBODIMENTS

For example, in a case where a radio communication apparatus is mounted in a mobile body such as a vehicle traveling at high speed, location environments for the radio communication apparatus may frequently change. In this case, a first base station search is likely to fail. There is a problem in that the above-described case involves wasteful power and time compared to a case in which the second base station search is initially performed. Such a problem is particularly acute for radio communication apparatuses (such as IoT communication apparatuses) that require reduced power consumption.

Thus, the present disclosure enables reduction of power consumption by realizing efficient base station searches.

First Embodiment

A first embodiment will be described below with reference to the drawings.
Configuration of Mobile Communication System FIG. 1 is a diagram illustrating a configuration of a mobile communication system 1 according to the first embodiment.

Figure 1:
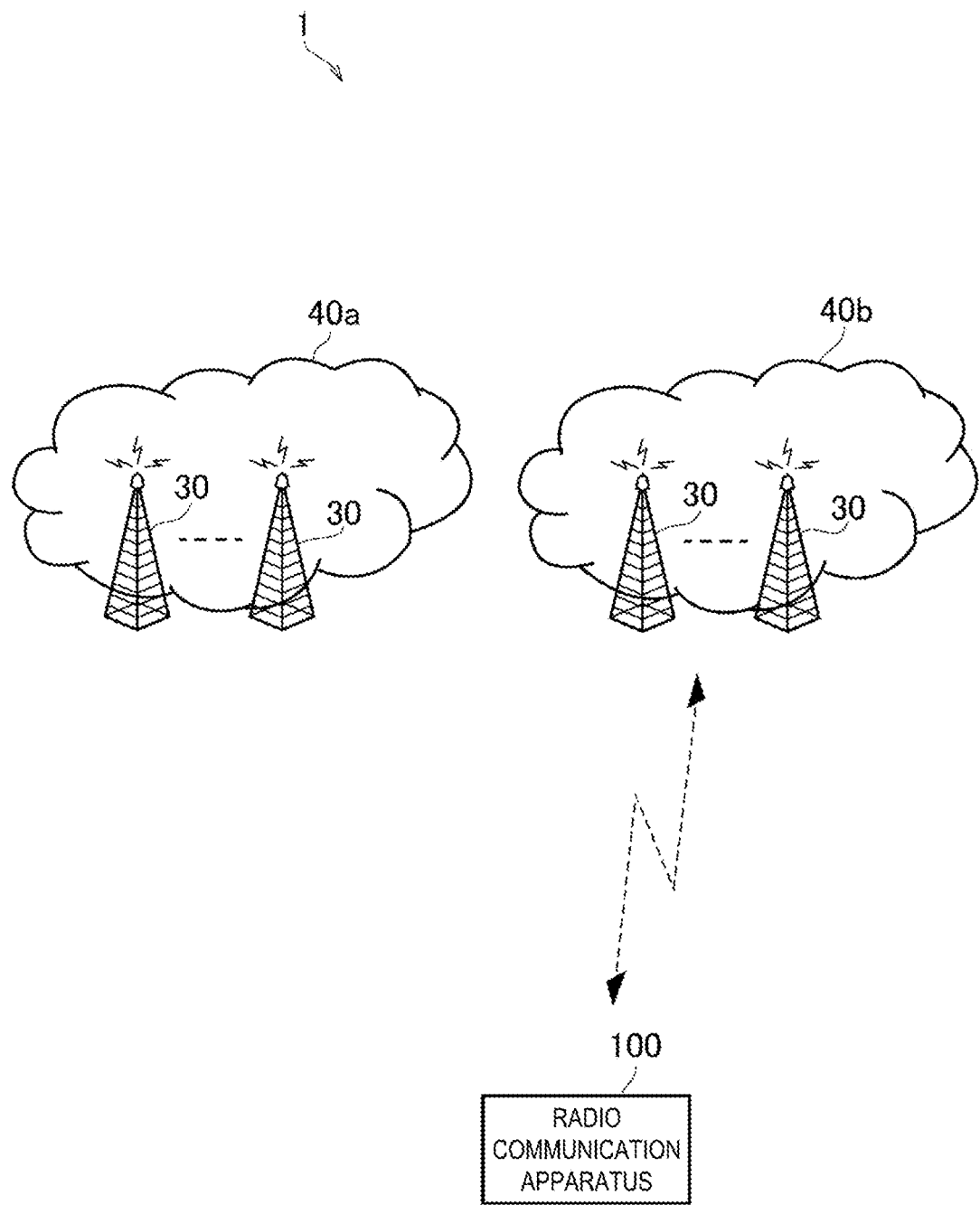
FIG. 1 is a diagram illustrating a configuration of a mobile communication system according to a first embodiment.

As illustrated in FIG. 1, the mobile communication system 1 includes a radio communication apparatus 100 and a plurality of carrier networks 40 (40a and 40b) provided by different carriers. The carrier network 40 may be referred to as a Public Land Mobile Network (PLMN).

Each carrier network 40 may support any mobile communication scheme such as a second generation mobile communication scheme such as Global System for Mobile Communications (GSM, trade name), a third generation mobile communication scheme such as Code Division Multiple Access (CDMA), or a fourth generation mobile communication scheme such as Long Term Evolution (LTE), or a fifth generation mobile communication scheme. Such a mobile communication scheme may be referred to as Radio Access Technology (RAT). The fifth generation mobile communication scheme may be referred to as New RAT (NR). Such a mobile communication scheme may be a mobile communication scheme defined by a standardization entity. The standardization entity may be 3rd Generation Partnership Project (3GPP), Institute of Electrical and Electronics Engineers (IEEE), or the like.

The carrier networks 40 may support different mobile communication schemes. For example, the carrier network 40a is for LTE and CDMA and does not support NR. The carrier network 40b supports LTE and NR, and does not support CDMA.

In a specific mobile communication scheme, the carrier networks 40 may support different frequency bands. For example, the carrier network 40a may support LTE bands 1, 3, 19, and 21, and the carrier network 40b may support only LTE bands 1 and 19.

The carrier networks 40 may cover different geographic areas. For example, the carrier network 40a covers an urban area and a suburban area, and the carrier network 40b may cover only the urban area.

Each carrier network 40 manages a plurality of base stations 30. Each carrier network 40 includes a network apparatus (not illustrated) that manages the location of the radio communication apparatus 100. One example of such a network apparatus is a Mobility Management Entity (MME).

Each base station 30 supports at least one of the above-described mobile communication schemes. Each base station 30 provides a mobile communication service in the coverage area of the base station 30 by using at least one of the above-described mobile communication schemes. Such a coverage area may be referred to as a "cell".

Each base station 30 manages one or a plurality of cells. In a case of managing a plurality of cells, each base station 30 may provide a mobile communication service using different mobile communication schemes and/or at different frequencies in the respective cells. Although not illustrated in FIG. 1, one base station 30 may belong to a plurality of carrier networks 40. In other words, one base station 30 may be shared among a plurality of carrier networks 40.

Each base station 30 periodically broadcasts a radio signal used by the radio communication apparatus 100 to search for the base station 30. The radio signal includes at least one of a reference signal, a synchronization signal, a control signal, and broadcast information. The broadcast information includes a PLMN number indicating the carrier network 40 to which the base station 30 belongs.

The radio communication apparatus 100 may be any radio communication apparatus, such as a communication module, an IoT apparatus, a mobile phone, a smartphone, or a personal computer. Although not illustrated in FIG. 1, the radio communication apparatus 100 may be mounted on a mobile body such as a vehicle.

The radio communication apparatus 100 discovers the appropriate base station 30 as a connection destination by a base station search, and performs location registration by executing a location registration procedure on the carrier network 40 to which the base station 30 belongs. As an example of the location registration procedure, the radio communication apparatus 100 transmits a request message requesting location registration to the network apparatus provided in the carrier network 40 to which the base station 30 belongs, and receives a response message for the request message from the network apparatus. In a case where the response message indicates acceptance of the request for location registration, the location registration procedure is successful. In a case where the response message indicates rejection of the request for location registration, the location registration procedure fails.
Configuration of Radio Communication Apparatus FIG. 2 is a diagram illustrating a configuration of the radio communication apparatus 100 according to the first embodiment.

Figure 2:
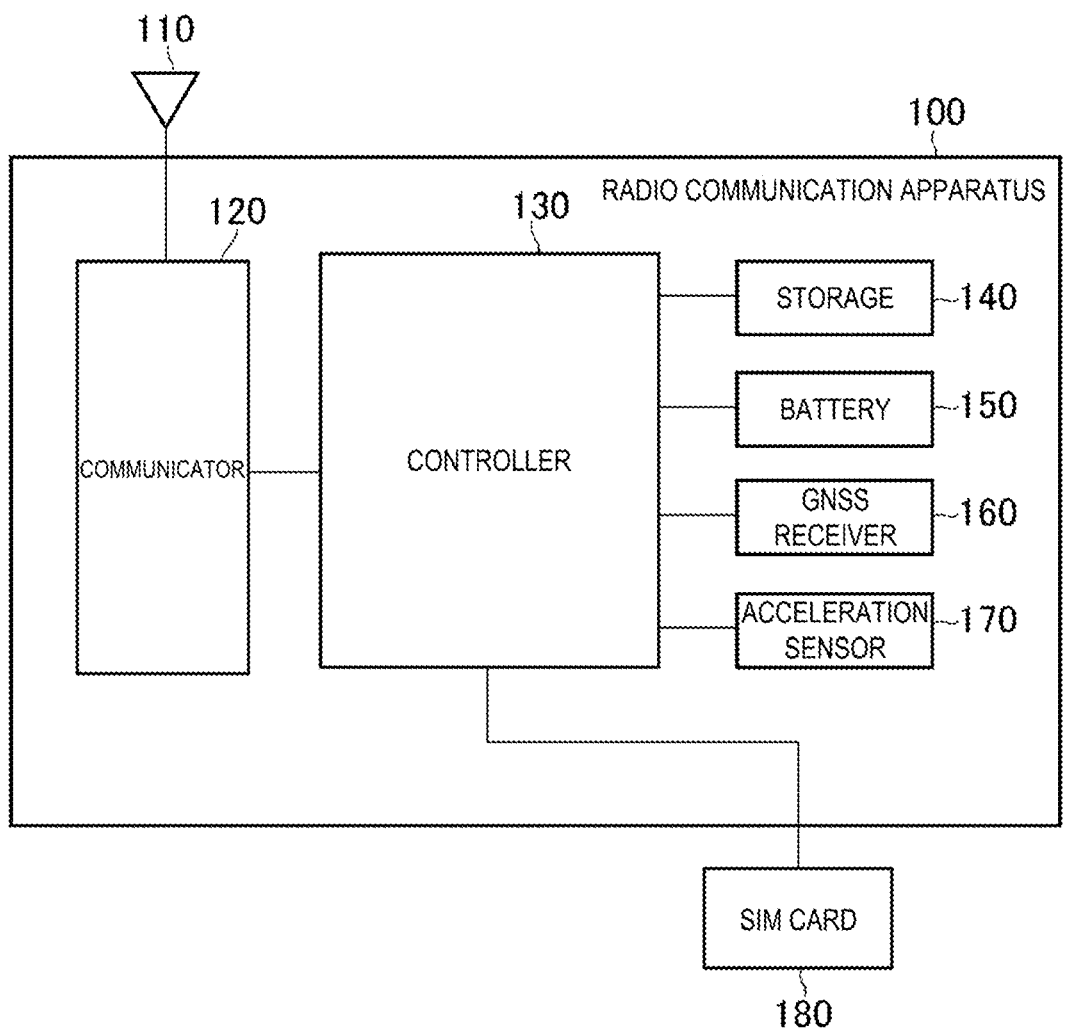
FIG. 2 is a diagram illustrating a configuration of a radio communication apparatus according to the first embodiment.

As illustrated in FIG. 2, the radio communication apparatus 100 includes an antenna 110, a communicator 120, a controller 130, a storage 140, a battery 150, a GNSS receiver 160, and an acceleration sensor 170. A SIM card 180 can be connected to the radio communication apparatus 100 via an interface (not illustrated).

The antenna 110 transmits and receives radio signals to and from the base station 30. The communicator 120 performs radio communication with the base station 30 via the antenna 110.

The communicator 120 supports at least one of the above-described mobile communication schemes.

The controller 130 performs various types of processing and control in the radio communication apparatus 100. The controller 130 includes at least one processor. The processor may include a baseband processor and a Central Processing Unit (CPU). The baseband processor performs, for example, modulation, demodulation, and coding and decoding of the baseband signal. The CPU performs various types of processing by executing programs stored in the storage 140.

The storage 140 includes a volatile memory and a nonvolatile memory, and is configured to store programs executed by the controller 130, and information and data used for processing by the controller 130.

The battery 150 supplies drive power for the radio communication apparatus 100.

The GNSS receiver 160 acquires location information (latitude and longitude information), and outputs the location information acquired to the controller 130. The GNSS receiver 160 may include a Global Positioning System (GPS) receiver, a Global Navigation Satellite System (GLONASS) receiver, an Indian Regional Navigational Satellite System (IRNSS) receiver, a COMPASS receiver, a Galileo receiver, and/or a QZSS Satellites System receiver. Although the first embodiment illustrates a configuration in which the GNSS receiver 160 is provided in the radio communication apparatus 100, the GNSS receiver 160 need not be provided in the radio communication apparatus 100. The GNSS receiver 160 may be provided in a mobile body in which the radio communication apparatus 100 is mounted. In a case where the GNSS receiver 160 is not provided in the radio communication apparatus 100, the controller 130 may acquire location information from the GNSS receiver 160 provided in the mobile body in which the radio communication apparatus 100 is mounted.

The acceleration sensor 170 measures the acceleration of the radio communication apparatus 100, and outputs a value indicative of the measured acceleration to the controller 130. The acceleration sensor 170 may be a single-axis acceleration sensor or a multi-axis acceleration sensor. While the first embodiment illustrates a configuration in which the acceleration sensor 170 is provided in the radio communication apparatus 100, the acceleration sensor 170 need not be provided in the radio communication apparatus 100. In a case where the acceleration sensor 170 is not provided in the radio communication apparatus 100, the controller 130 may acquire the acceleration information from the acceleration sensor 170 provided in the mobile body in which the radio communication apparatus 100 is mounted.

The SIM card 180 is an IC card recording thereon information for identifying a subscriber and information about services available which the subscriber is subscribed for. Information required to receive the services is recorded in the SIM card 180.

The SIM card 180 may be an eSIM (Embedded SIM) which is of an embedded type. The SIM card 180 may be located outside the radio communication apparatus 100. The SIM card 180 may be provided by a carrier or may be obtained by other means. By installing or connecting the SIM card 180 provided in or to the radio communication apparatus 100, the user is allowed to use the radio communication apparatus 100.

Search auxiliary information described below may be stored in the storage 140. The search auxiliary information may be stored in the SIM card 180. Typically, the search auxiliary information is not stored in the storage 140 when the radio communication apparatus 100 is shipped. In some cases, the controller 130 may delete the search auxiliary information stored in the storage 140 and/or the SIM card 180.

The search auxiliary information is information used by the radio communication apparatus 100 to search for a base station. The search auxiliary information may be information for limiting a range to be searched. The range to be searched may be a frequency range.

After location registration, the radio communication apparatus 100 stores base station information related to the base station 30 used as a connection destination during location registration as search auxiliary information for the next base station search.

The search auxiliary information includes at least one of carrier network information, mobile communication scheme information, and frequency band information.

The carrier network information is information (such as a PLMN number) for identifying at least one carrier network 40. The controller 130 performs the first base station search on the carrier network 40 identified by the carrier network information included in the search auxiliary information.

The mobile communication scheme information is information for identifying at least one mobile communication scheme. For example, the mobile communication scheme information indicates LTE. The controller 130 performs the first base station search in accordance with the mobile communication scheme identified by the mobile communication scheme information included in the search auxiliary information.

The frequency band information is information for identifying at least one frequency band. The frequency band may be an identifier of a frequency band belonging to a specific mobile communication scheme (hereinafter, referred to as a "frequency band identifier"), may be one numerical value representing a frequency band, or may be a range identified by two numbers. The frequency band identifier may be, for example, an LTE band number. Information indicating the correspondence relationship between the frequency band identifier and the frequency band may be stored in the storage 140 and/or SIM card 180 in advance. The controller 130 performs the first base station search on the frequency band identified by the frequency band information included in the search auxiliary information.

In the radio communication apparatus 100 configured in this manner, when searching for a base station used as a connection destination, the controller 130 performs, in a case where the search auxiliary information is stored, the first base station search based on the search auxiliary information.

In the first base station search, by storing, as search auxiliary information, information related to the base station 30 to which the radio communication apparatus 100 has previously been connected, the base station search is performed using only some of the frequencies supported by the communicator 120. Here, "search auxiliary information is stored" means that the search auxiliary information is present in the storage 140 and/or the SIM card 180.

In response to failure in the first base station search or in a case where the search auxiliary information is not stored, the controller 130 performs the second base station search on all frequencies supported by the communicator 120. Specifically, the controller 130 attempts to receive a radio signal from the base station over a frequency range including all the frequencies supported by the communicator 120. In other words, the second base station search is a base station search in a wide frequency range compared to the first base station search. Note that in a case where the communicator 120 supports a plurality of mobile communication schemes, the controller 130 may perform the second base station search on all the frequencies of the plurality of mobile communication schemes.

Then, in a case where the first base station search or the second base station search is successful, the controller 130 determines whether to store base station information related to the base station 30 used as a connection destination, as search auxiliary information based on the movement state of the radio communication apparatus 100 when location registration is performed via the base station 30 of the connection destination determined by the search.

The base station information includes at least one of carrier network information, mobile communication scheme information, and frequency band information for the base station 30 used as a connection destination. The controller 130 may acquire, from the radio signal received from the base station 30 used as a connection destination, a carrier network to which the base station 30 belongs, a mobile communication scheme supported by the base station 30, and/or a frequency band used by the base station 30.

Specifically, the controller 130 determines to store the base station information as search auxiliary information in a case where the value indicating the movement state is less than or equal to a first threshold value, and determines not to store the base station information as search auxiliary information in a case where the value indicating the movement state is greater than the first threshold value.

The movement state of the radio communication apparatus 100 may be at least one of the movement speed of the radio communication apparatus 100 and the acceleration of the radio communication apparatus. For example, the controller 130 may calculate the movement speed of the radio communication apparatus 100 based on a shift in location indicated by the location information acquired from the GNSS receiver 160. The controller 130 may acquire a value indicative of the acceleration of the radio communication apparatus 100 from the acceleration sensor 170. Alternatively, the controller 130 may estimate the movement speed of the radio communication apparatus 100 from the number of cell transfers per unit time (e.g., the number of cell re-selections or the number of handovers).

In this manner, whether to store, as search auxiliary information, the base station information related to the base station 30 used as a connection destination is determined based on the movement state. For example, during movement at high speed, the likelihood that the search auxiliary information will be useless (in other words, the likelihood that the first base station search will fail) is high when the next base station search is performed, and thus, for example, during movement at high speed, storing the base station information as search auxiliary information can be avoided. Thus, when the base station used as a connection destination is subsequently searched for, the search can be started with the second base station search, with the first base station search omitted. As a result, the overall search time can be shortened and power consumption can be reduced.

Operation Example of Radio Communication Apparatus

Figure 3:
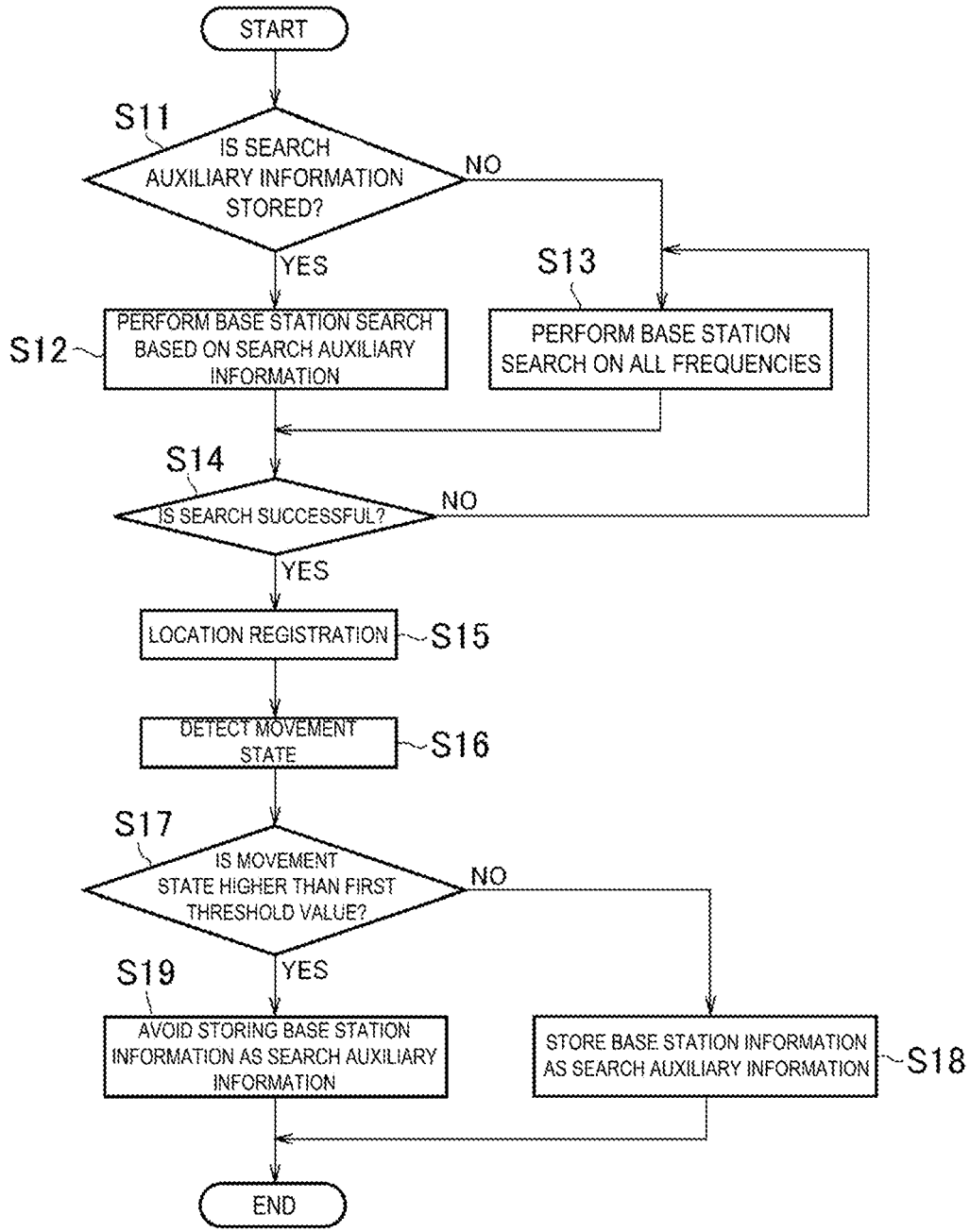
FIG. 3 is a diagram illustrating an operation example of the radio communication apparatus according to the first embodiment.

FIG. 3 is a diagram illustrating an operation example of the radio communication apparatus 100 according to the first embodiment.

The operation flow in FIG. 3 starts in a situation where the radio communication apparatus 100 needs to search for the base station used as a connection destination. Such a situation may include power on of the radio communication apparatus 100 and/or recovery from an out-of-service state.

As illustrated in FIG. 3, in step S11, the controller 130 checks whether the search auxiliary information is stored. Specifically, the controller 130 accesses the storage 140 or the SIM card 180, and checks whether the search auxiliary information is present in the storage 140 or the SIM card 180.

In a case where the search auxiliary information is stored (step S11: YES), in step S12, the controller 130 performs the first base station search based on the search auxiliary information. For example, the controller 130 determines a frequency range to be searched based on the search auxiliary information, and attempts to receive radio signals from the base station 30 over the frequency range for a predetermined period of time.

In step S14, the controller 130 determines whether the first base station search is successful. Specifically, the controller 130 checks whether a radio signal received by using the first base station search satisfies a predetermined criterion, and when reception of the radio signal satisfying the predetermined criterion is confirmed, the controller 130 determines that the search is successful. The predetermined criterion may be a criterion to be satisfied by the reception strength and/or reception quality of the radio signal.

On the other hand, in a case where the search auxiliary information is not stored (step S11: NO), or a case of determination of failure in the first base station search (step S14: NO), the controller 130 performs the second base station search on all the frequencies corresponding to the communicator 120 in step S13. Then, the controller 130 takes the processing to step S14.

In a case of reception of a radio signal satisfying the predetermined criterion by using the first base station search or the second base station search (step S14: YES), the controller 130 performs a connection procedure on the base station 30 transmitting the radio signal, and performs a location registration procedure on the carrier network 40 to which the base station 30 belongs in step S15.

In response to reception of a plurality of radio signals satisfying the predetermined criterion, the controller 130 may perform a connection procedure on the base station 30 transmitting a radio signal with the highest reception strength or the highest reception quality.

In step S16, the controller 130 detects the movement state of the radio communication apparatus 100 during location registration (i.e., the controller 130 acquires a value indicating the movement state). "During location registration" may correspond to the time of reception of a response message indicating approval of a request for location registration, or may correspond to the time of transmission of a request message requesting location registration.

In steps S17 to S19, the controller 130 determines whether to store the base station information related to the base station 30 used as a connection destination, as search auxiliary information based on the movement state of the radio communication apparatus 100 detected in step S16.

Specifically, in step S17, the controller 130 compares the value indicating the movement state of the radio communication apparatus 100 with the first threshold value. In a case where the value indicating the movement state is less than or equal to the first threshold value (step S17: NO), the controller 130 determines to store the base station information as search auxiliary information, and stores the base station information in the storage 140 and/or the SIM card 180 in step S18. In a case where the search auxiliary information is already stored in the storage 140 and/or the SIM card 180, the controller 130 may overwrite the stored search auxiliary information.

On the other hand, in a case where the value indicating the movement state is greater than the first threshold value (step S17: YES), the controller 130 determines not to store the base station information as search auxiliary information, and avoids storing the base station information in the storage 140 and/or the SIM card 180 in step S19.

Modification 1 of First Embodiment

In the operation of the radio communication apparatus 100 in the operation example described above, whether to store the base station information as search auxiliary information is determined based on the movement state of the radio communication apparatus 100 during location registration. However, such determination may be performed in consideration of a radio wave condition in the radio communication apparatus 100 during location registration.

In a case where the radio wave condition in the radio communication apparatus 100 is poor (e.g., the reception strength of the radio signal from the base station 30 used as a connection destination is low), the radio communication apparatus 100 is likely to be located near an edge of the coverage area of the base station 30 used as a connection destination. In this case, for example, even in a case where the radio communication apparatus 100 is moving at low speed, the first base station search is likely to fail because the radio communication apparatus is likely to be located out of the coverage area during the next base station search.

In Modification 1 of the first embodiment, the controller 130 determines not to store the base station information as search auxiliary information in a case where a value indicating the radio wave condition in the radio communication apparatus 100 during location registration is less than the second threshold value even in a case where a value indicating the movement state of the radio communication apparatus 100 during location registration is equal to or less than the first threshold value.

This enables avoidance of storing, as search auxiliary information, the base station information that is likely to be useless during the next base station search. Thus, the search can be started with the second base station search, with the first base station search omitted. As a result, the overall search time can be shortened and power consumption can be reduced.

Figure 4:
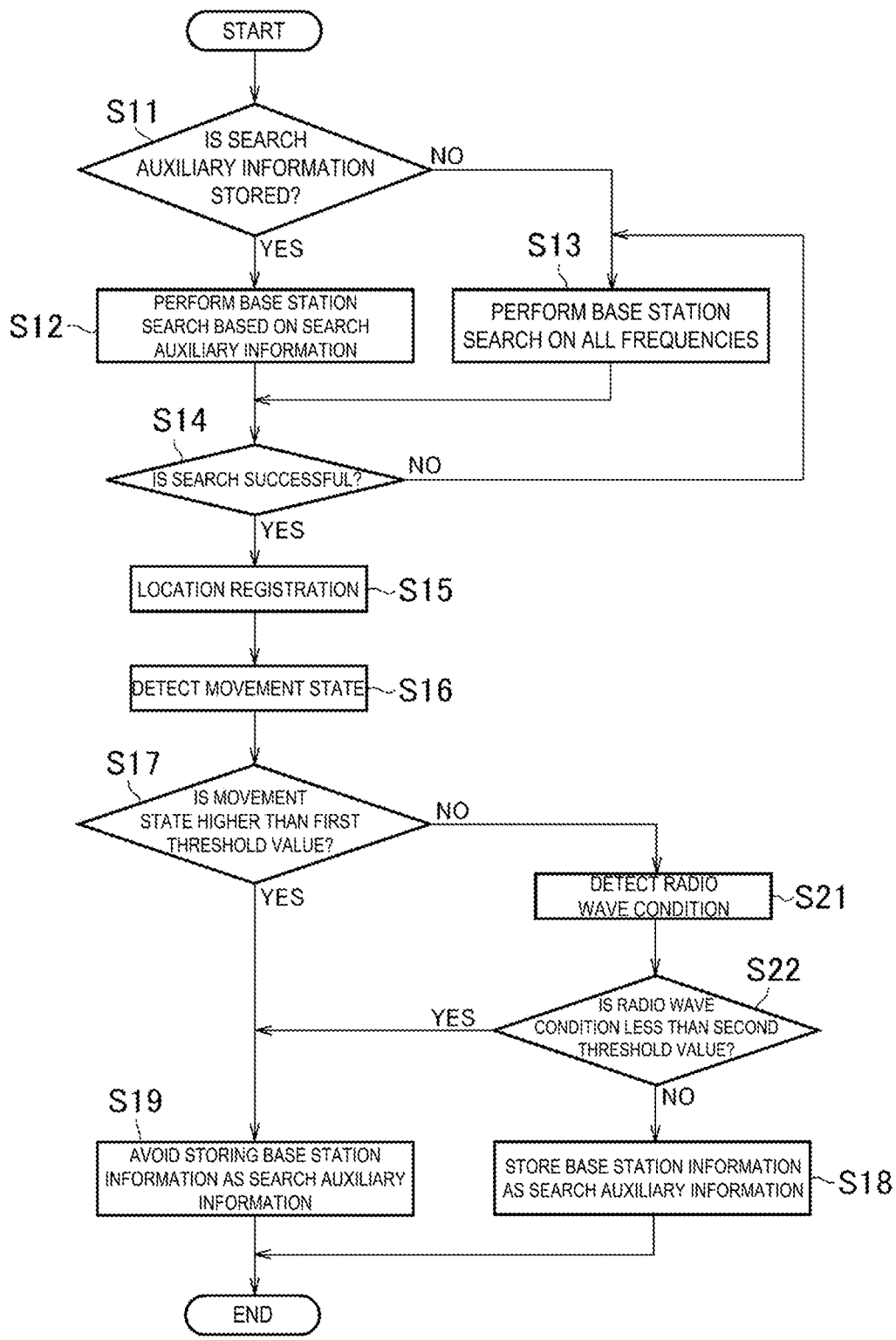
FIG. 4 is a diagram illustrating Modification 1 of operation of the radio communication apparatus according to the first embodiment.

FIG. 4 is a diagram illustrating Modification 1 of the operation example of the radio communication apparatus according to the first embodiment. Here, differences from FIG. 3 will be described.

As illustrated in FIG. 4, the contents of processing in steps S11 to S17, S18, and S19 are similar to the contents of processing in the identical steps in FIG. 3, but FIG. 4 differs from FIG. 3 in that operations related to the radio wave condition are performed in steps S21 and S22.

In step S21, the controller 130 detects the radio wave condition in the radio communication apparatus 100 during location registration (i.e., the controller 130 acquires a value indicative of the radio wave condition).

The radio wave condition in the radio communication apparatus 100 may be at least one of the reception strength of the radio signal received by the controller 130 from the base station 30 used as a connection destination, and the channel quality of the communication channel between the radio communication apparatus 100 and the base station 30 used as a connection destination (e.g., Signal-to-Interference plus Noise power Ratio (SINR)).

In step S22, the controller 130 compares the value indicating the radio wave condition with the second threshold value. In a case where the value indicating the radio wave condition is less than the second threshold value (step S22: YES), then in step S19, the controller 130 determines not to store the base station information as search auxiliary information, and avoids storing the base station information in the storage 140 and/or the SIM card 180. On the other hand, in a case where the value indicating the radio wave condition is greater than the second threshold value (step S22: NO), then in step S18, the controller 130 determines to store the base station information as search auxiliary information, and stores the base station information in the storage 140 and/or the SIM card 180.

Modification 2 of First Embodiment

In the operation of the radio communication apparatus 100 in the above-described operation example, whether to store the base station information as search auxiliary information is determined based on the movement state of the radio communication apparatus 100 during location registration. However, such determination may be made taking into consideration the coverage range of the base station 30 used as a connection destination during location registration.

In a case where the coverage range of the base station 30 used as a connection destination is narrow, for example, the radio communication apparatus 100 is likely to be located out of the coverage range during the next base station search even in a case where the radio communication apparatus 100 moves at low speed. Thus, the radio communication apparatus 100 is likely to fail in the first base station search. Examples of the base station 30 having a narrow coverage range include a femtocell base station (also referred to as a home base station), a picocell base station, and/or a microcell base station.

In Modification 2 of the first embodiment, in a case where the value indicating the movement state is equal to or less than the first threshold value, the controller 130 determines not to store the base station information as search auxiliary information in a case where the value indicating the coverage range of the base station 30 used as a connection destination is less than the third threshold value.

This enables avoidance of storing, as search auxiliary information, the base station information that is likely to be useless during the next base station search. Thus, the search can be started with the second base station search, with the first base station search omitted. As a result, the overall search time can be shortened and power consumption can be reduced.

Figure 5:
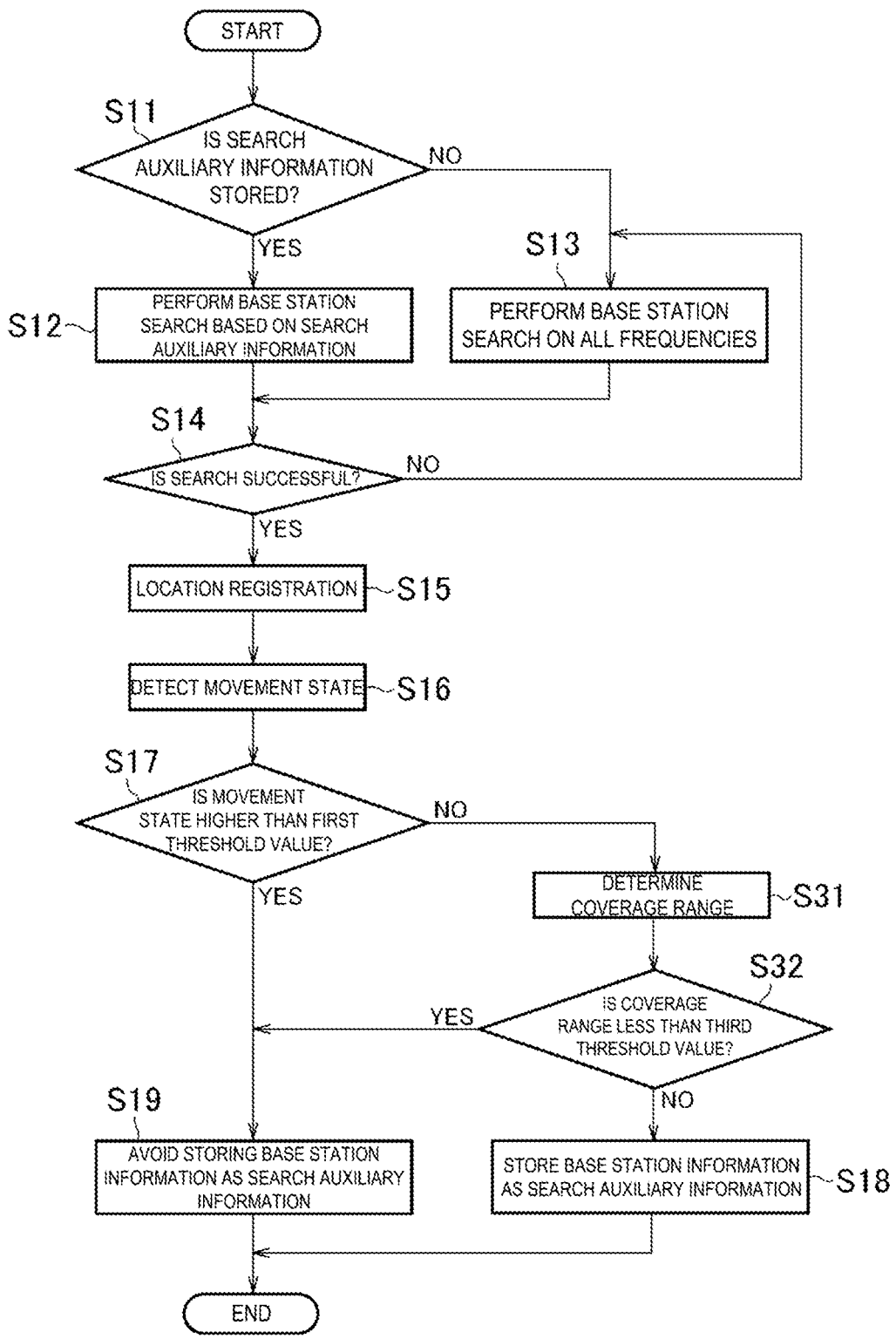
FIG. 5 is a diagram illustrating Modification 2 of the operation of the radio communication apparatus according to the first embodiment.

FIG. 5 is a diagram illustrating Modification 2 of the operation example of the radio communication apparatus according to the first embodiment. Here, differences from FIG. 3 will be described.

As illustrated in FIG. 5, the contents of processing in steps S1*l* to S17, S18, and S19 are similar to the contents of processing in the identical steps in FIG. 3, but FIG. 5 differs from FIG. 3 in that operations related to the coverage range are performed in steps S31 and S32.

In step S31, the controller 130 determines the coverage range of the base station 30 of the connection destination during location registration (i.e., the controller 130 acquires a value indicating the coverage range). The controller 130 may acquire the value indicating the coverage range of the base station 30 from the base station 30 used as a connection destination.

In step S32, the controller 130 compares the value indicating the coverage range with the third threshold value. In a case where the value indicating the coverage range is less than the third threshold value (step S32: YES), then in step S19, the controller 130 determines not to store the base station information as search auxiliary information, and avoids storing the base station information in the storage 140 and/or the SIM card 180. On the other hand, in a case where the value indicating the coverage range is greater than the third threshold value (step S32: NO), the controller 130 determines to store the base station information as search auxiliary information, and stores the base station information in the storage 140 and/or the SIM card 180 in step S18.

Modification 3 of First Embodiment

In a case where the radio communication apparatus 100 is an IoT apparatus or the like, a power storing technology may be used in which power consumption is reduced by switching the communicator 120 between an inactive state and an active state. The inactive state is a state in which the communicator 120 does not transmit and/or receive radio signals. A longer duration of the inactive state produces a higher power storing effect, and in some cases, the duration of the inactive state may span several days. The duration of such an inactive state may be pre-configured or may be configured by a network apparatus and/or the base station 30. An example of such a power storing technique is an extended Discontinuous Reception (eDRX).

When the communicator 120 returns from the inactive state to the active state, the controller 130 needs to perform location registration again. In the operation of the radio communication apparatus 100 in the operation example described above, whether to store the base station information as search auxiliary information based on the movement state of the radio communication apparatus 100 during location registration. However, the determination may be made taking into consideration the length of the assumed time after location registration is performed and before the next location registration is performed. The controller 130 can determine such assumed time from the time after location registration is performed and before the next location registration is performed.

For a long assumed time after location registration is performed and before the next location registration is performed, even when the radio communication apparatus 100 is moving at low speed, for example, the first base station search is likely to fail because the radio communication apparatus is likely to be located out of the coverage range when the base station search is performed in association with the next location registration.

In Modification 3 of the first embodiment, even in a case where the value indicating the movement state is less than or equal to the first threshold value, the controller 130 determines not to store the base station information as search auxiliary information in a case where the length of the assumed time after location registration is performed and before the next location registration is performed (hereinafter simply referred to as the "assumed time") is longer than a fourth threshold value.

This enables avoidance of storing, as search auxiliary information, the base station information that is likely to be useless during the next base station search. Thus, the search can be started with the second base station search, with the first base station search omitted. As a result, the overall search time can be shortened and power consumption can be reduced.

Figure 6:
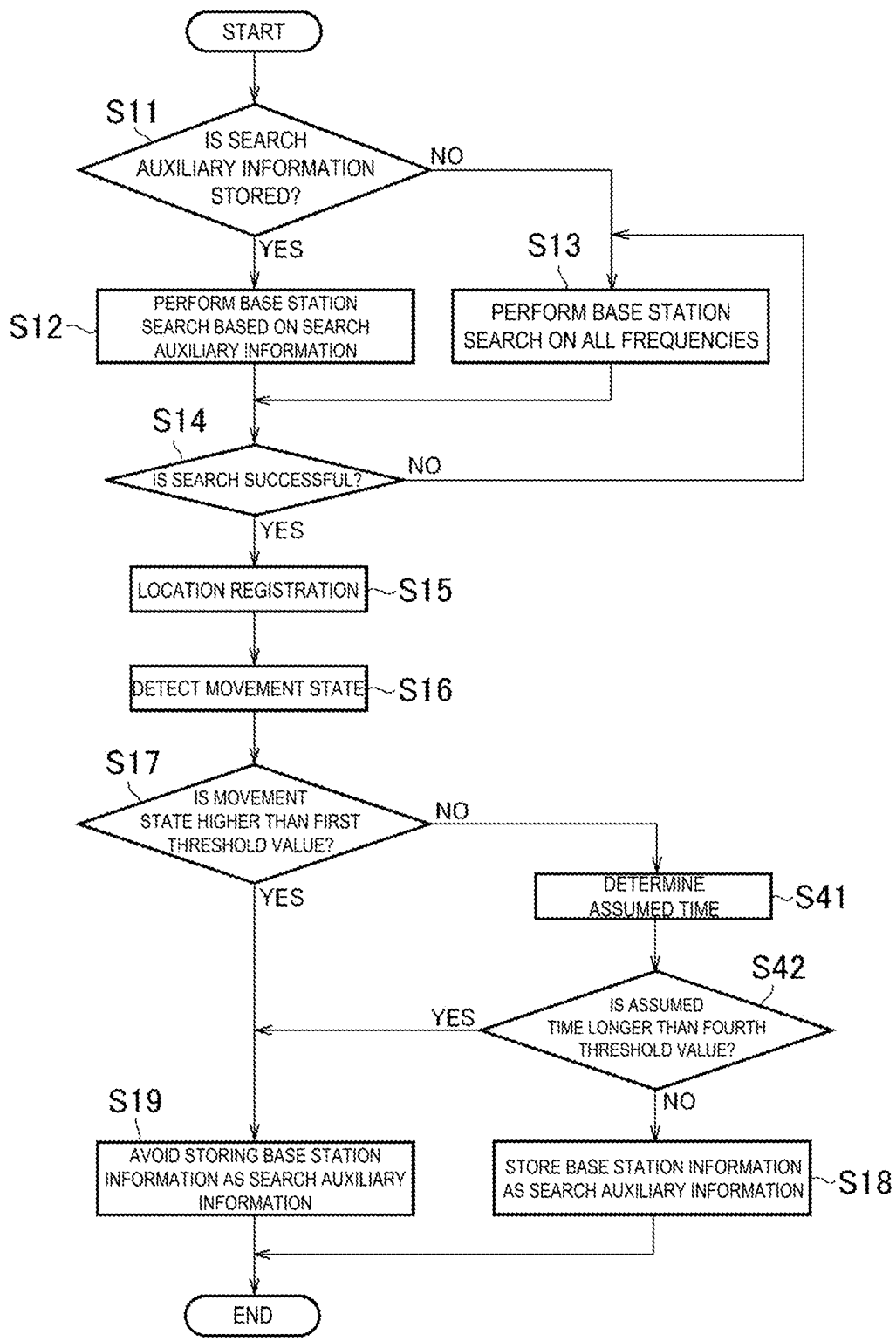
FIG. 6 is a diagram indicating Modification 3 of the operation of the radio communication apparatus according to the first embodiment.

FIG. 6 is a diagram illustrating Modification 3 of the operation example of the radio communication apparatus according to the first embodiment. Here, differences from FIG. 3 will be described.

As illustrated in FIG. 6, the contents of processing in steps S1*l* to S17, S18, and S19 are similar to the contents of processing in the identical steps in FIG. 3, but FIG. 6 differs from FIG. 3 in that operations related to the assumed time are performed in steps S41 and S42.

In step S41, the controller 130 determines the length of an assumed time. The controller 130 may determine the length of the assumed time based on the pre-configured duration of the inactive state.

In step S42, the controller 130 compares the length of the assumed time with the fourth threshold value. In a case where the length of the assumed time is less than the fourth threshold value (step S42: YES), then in step S19, the controller 130 determines not to store the base station information as search auxiliary information, and avoids storing the base station information in the storage 140 and/or the SIM card 180. On the other hand, in a case where the length of the assumed time is greater than the fourth threshold value (step S42: NO), then in step S18, the controller 130 determines to store the base station information as search auxiliary information, and stores the base station information in the storage 140 and/or the SIM card 180.

Second Embodiment

A second embodiment will be described below with reference to the drawings. A second embodiment will be described while focusing on differences from the above-described first embodiment.

Configuration of Mobile Communication System

Figures illustrating a configuration of a mobile communication system 1 according to a second embodiment is similar to the figures illustrating the configuration of the mobile communication system 1 according to the first embodiment. Thus, in the following description, the configuration of the mobile communication system 1 according to the second embodiment will be described with reference to FIG. 1.

As illustrated in FIG. 1, the mobile communication system 1 includes a radio communication apparatus 100 and a plurality of carrier networks 40 (40*a* and 40*b*) provided by different carriers. The carrier network 40 may be referred to as a Public Land Mobile Network (PLMN).

Each carrier network 40 may support any mobile communication scheme such as a second generation mobile communication scheme such as Global System for Mobile Communications (GSM, trade name), a third generation mobile communication scheme such as Code Division Multiple Access (CDMA), or a fourth generation mobile communication scheme such as Long Term Evolution (LTE), or a fifth generation mobile communication scheme. Such a mobile communication scheme may be referred to as Radio Access Technology (RAT). The fifth generation mobile communication scheme may be referred to as New RAT (NR). Such a mobile communication scheme may be a mobile communication scheme defined by a standardization entity. The standardization entity may be 3rd Generation Partnership Project (3GPP), Institute of Electrical and Electronics Engineers (IEEE), and the like.

The carrier networks 40 may support different mobile communication schemes. For example, the carrier network 40*a* is for LTE and CDMA and does not support NR. The carrier network 40*b* supports LTE and NR, and does not support CDMA.

In a specific mobile communication scheme, the carrier networks 40 may support different frequency bands. For example, the carrier network 40*a* may support LTE bands 1, 3, 19, and 21, and the carrier network 40*b* may support only LTE bands 1 and 19.

The carrier networks 40 may cover different geographic areas. For example, the carrier network 40*a* covers an urban area and a suburban area, and the carrier network 40*b* may cover only the urban area.

Each carrier network 40 manages a plurality of base stations 30. Each carrier network 40 includes a network apparatus (not illustrated) that manages the location of the radio communication apparatus 100. One example of such a network apparatus is a Mobility Management Entity (MME).

Each base station 30 supports at least one of the above-described mobile communication schemes. Each base station 30 provides a mobile communication service in the coverage area of the base station 30 by using at least one of the above-described mobile communication schemes. Such a coverage area may be referred to as a "cell".

Each base station 30 manages one or a plurality of cells. In a case of managing a plurality of cells, each base station 30 may provide a mobile communication service using different mobile communication schemes and/or at different frequencies in the respective cells. Although not illustrated in FIG. 1, one base station 30 may belong to a plurality of carrier networks 40. In other words, one base station 30 may be shared among a plurality of carrier networks 40.

Each base station 30 periodically broadcasts a radio signal used by the radio communication apparatus 100 to search for the base station 30. The radio signal includes at least one of a reference signal, a synchronization signal, a control signal, and broadcast information. The broadcast information includes a PLMN number indicating the carrier network 40 to which the base station 30 belongs.

The radio communication apparatus 100 may be any radio communication apparatus, such as a communication module, an IoT apparatus, a mobile phone, a smartphone, or a personal computer. Although not illustrated in FIG. 1, the radio communication apparatus 100 may be mounted on a mobile body such as a vehicle.

The radio communication apparatus 100 discovers the appropriate base station 30 as a connection destination by the base station search in response to power on or recovery to an in-service state, and performs location registration by executing a location registration procedure on the carrier network 40 to which the base station 30 belongs. As an example of the location registration procedure, the radio communication apparatus 100 transmits a request message requesting location registration to the network apparatus provided in the carrier network 40 to which the base station 30 belongs, and receives a response message for the request message from the network apparatus. In a case where the response message indicates acceptance of the request for location registration, the location registration procedure is successful. In a case where the response message indicates rejection of the request for location registration, the location registration procedure fails.

Configuration of Radio Communication Apparatus

Figures illustrating a configuration of the radio communication apparatus 100 according to the second embodiment are similar to the figures illustrating the configuration of the radio communication apparatus 100 according to the first embodiment. Thus, in the following description, the configuration of the radio communication apparatus 100 according to the second embodiment will be described with reference to FIG. 2.

As illustrated in FIG. 2, the radio communication apparatus 100 includes an antenna 110, a communicator 120, a controller 130, a storage 140, a battery 150, a GNSS receiver 160, and an acceleration sensor 170. A SIM card 180 can be connected to the radio communication apparatus 100 via an interface (not illustrated).

The antenna 110 transmits and receives radio signals to and from the base station 30. The communicator 120 performs radio communication with the base station 30 via the antenna 110.

The communicator 120 supports at least one of the above-described mobile communication schemes.

The controller 130 performs various types of processing and control in the radio communication apparatus 100. The controller 130 includes at least one processor. The processor may include a baseband processor and a Central Processing Unit (CPU). The baseband processor performs, for example, modulation, demodulation, and coding and decoding of the baseband signal. The CPU performs various types of processing by executing programs stored in the storage 140.

The storage 140 includes a volatile memory and a non-volatile memory, and is configured to store programs executed by the controller 130, and information and data used for processing by the controller 130.

The battery 150 supplies drive power for the radio communication apparatus 100.

The GNSS receiver 160 acquires location information (latitude and longitude information), and outputs the location information acquired to the controller 130. The GNSS receiver 160 may include a Global Positioning System (GPS) receiver, a Global Navigation Satellite System (GLONASS) receiver, an Indian Regional Navigational Satellite System (IRNSS) receiver, a COMPASS receiver, a Galileo receiver, and/or a QZSS Satellites System receiver. Although the second embodiment illustrates a configuration in which the GNSS receiver 160 is provided in the radio communication apparatus 100, the GNSS receiver 160 need not be provided in the radio communication apparatus 100. The GNSS receiver 160 may be provided in a mobile body in which the radio communication apparatus 100 is mounted. In a case where the GNSS receiver 160 is not provided in the radio communication apparatus 100, the controller 130 may acquire location information from the GNSS receiver 160 provided in the mobile body in which the radio communication apparatus 100 is mounted.

The acceleration sensor 170 measures the acceleration of the radio communication apparatus 100, and outputs a value indicative of the measured acceleration to the controller 130. The acceleration sensor 170 may be a single-axis acceleration sensor or a multi-axis acceleration sensor. While the second embodiment illustrates a configuration in which the acceleration sensor 170 is provided in the radio communication apparatus 100, the acceleration sensor 170 need not be provided in the radio communication apparatus 100. In a case where the acceleration sensor 170 is not provided in the radio communication apparatus 100, the controller 130 may acquire the acceleration information from the acceleration sensor 170 provided in the mobile body in which the radio communication apparatus 100 is mounted.

The SIM card 180 is an IC card recording thereon information for identifying a subscriber and information about services available which the subscriber is subscribed for. Information required to receive the services is recorded in the SIM card 180.

The SIM card 180 may be an eSIM (Embedded SIM) which is of an embedded type. The SIM card 180 may be located outside the radio communication apparatus 100. The SIM card 180 may be provided by a carrier or may be obtained by other means. By installing or connecting the SIM card 180 provided in or to the radio communication apparatus 100, the user is allowed to use the radio communication apparatus 100.

Search auxiliary information described below may be stored in the storage 140. The search auxiliary information may be stored in the SIM card 180. Typically, the search auxiliary information is not stored in the storage 140 when the radio communication apparatus 100 is shipped. In some cases, the controller 130 may delete the search auxiliary information stored in the storage 140 and/or the SIM card 180.

The search auxiliary information is information used by the radio communication apparatus 100 to search for a base station. The search auxiliary information may be information for limiting a range to be searched. The range to be searched may be a frequency range.

After location registration, the radio communication apparatus 100 stores base station information related to the base station 30 used as a connection destination during location registration as search auxiliary information for the next base station search.

The search auxiliary information includes at least one of carrier network information, mobile communication scheme information, and frequency band information.

The carrier network information is information (such as a PLMN number) for identifying at least one carrier network 40. The controller 130 performs the first base station search on the carrier network 40 identified by the carrier network information included in the search auxiliary information.

The mobile communication scheme information is information for identifying at least one mobile communication scheme. For example, the mobile communication scheme information indicates LTE. The controller 130 performs the first base station search in accordance with the mobile communication scheme identified by the mobile communication scheme information included in the search auxiliary information.

The frequency band information is information for identifying at least one frequency band. The frequency band may be an identifier of a frequency band belonging to a specific mobile communication scheme (hereinafter, referred to as a "frequency band identifier"), may be one numerical value representing a frequency band, or may be a range identified by two numbers. The frequency band identifier may be, for example, an LTE band number. Information indicating the correspondence relationship between the frequency band identifier and the frequency band may be stored in the storage 140 and/or SIM card 180 in advance. The controller 130 performs the first base station search on the frequency band identified by the frequency band information included in the search auxiliary information.

In the radio communication apparatus 100 configured in this manner, when searching for a base station used as a connection destination, the controller 130 performs, in a case where the search auxiliary information is stored, the first base station search based on the search auxiliary information.

In the first base station search, by storing, as search auxiliary information, information related to the base station 30 to which the radio communication apparatus 100 has previously been connected, the base station search is performed using only some of the frequencies supported by the communicator 120. Here, "search auxiliary information is stored" means that the search auxiliary information is present in the storage 140 and/or the SIM card 180.

In response to failure in the first base station search or in a case where the search auxiliary information is not stored, the controller 130 performs the second base station search on all frequencies supported by the communicator 120. Specifically, the controller 130 attempts to receive a radio signal from the base station over a frequency range including all the frequencies supported by the communicator 120. In other words, the second base station search is a base station search in a wide frequency range compared to the first base station search. Note that in a case where the communicator 120 supports a plurality of mobile communication schemes, the controller 130 may perform the second base station search on all the frequencies of the plurality of mobile communication schemes.

In a case where the first base station search or the second base station search is successful, when performing location registration via the base station 30 determined to be a connection destination by using the first base station search or the second base station search, the controller 130 stores, as search auxiliary information, the base station information related to the base station 30 used as a connection destination.

The base station information includes at least one of carrier network information, mobile communication scheme information, and frequency band information for the base station 30 used as a connection destination. The controller 130 may acquire, from the radio signal received from the base station 30 used as a connection destination, a carrier network to which the base station 30 belongs, a mobile communication scheme supported by the base station 30, and/or a frequency band used by the base station 30.

The controller 130 determines whether to delete the stored search auxiliary information based on the movement state of the radio communication apparatus. Specifically, in a case where the value indicating the movement state is less than or equal to the first threshold value, the controller 130 determines not to delete the stored search auxiliary information. On the other hand, in a case where the value indicating the movement state is greater than the first threshold value, the controller 130 determines to delete the stored search auxiliary information. Note that the first threshold value in the second embodiment may be identical to or different from the first threshold value in the first embodiment.

The movement state of the radio communication apparatus 100 may be at least one of the movement speed of the radio communication apparatus 100 and the acceleration of the radio communication apparatus. For example, the controller 130 may calculate the movement speed of the radio communication apparatus 100 based on a shift in location indicated by the location information acquired from the GNSS receiver 160. The controller 130 may acquire a value indicative of the acceleration of the radio communication apparatus 100 from the acceleration sensor 170. Alternatively, the controller 130 may estimate the movement speed of the radio communication apparatus 100 from the number of cell transfers per unit time (e.g., the number of cell re-selections or the number of handovers).

In this manner, whether to delete the search auxiliary information is determined based on the movement state. For example, in a situation where the radio communication apparatus 100 transitions from the in-service state to the out-of-service state during high-speed movement, the likelihood that the search auxiliary information will be useless (i.e., the likelihood that the first base station search will fail) is high when the base station search is performed in order to recover from the out-of-service state to the in-service state. Thus, the search auxiliary information can be deleted, for example, during high-speed movement. Thus, when the base station used as a connection destination is subsequently searched for, the search can be started with the second base station search, with the first base station search omitted. As a result, the overall search time can be shortened and power consumption can be reduced.

Operation Example of Radio Communication Apparatus

Figure 7:
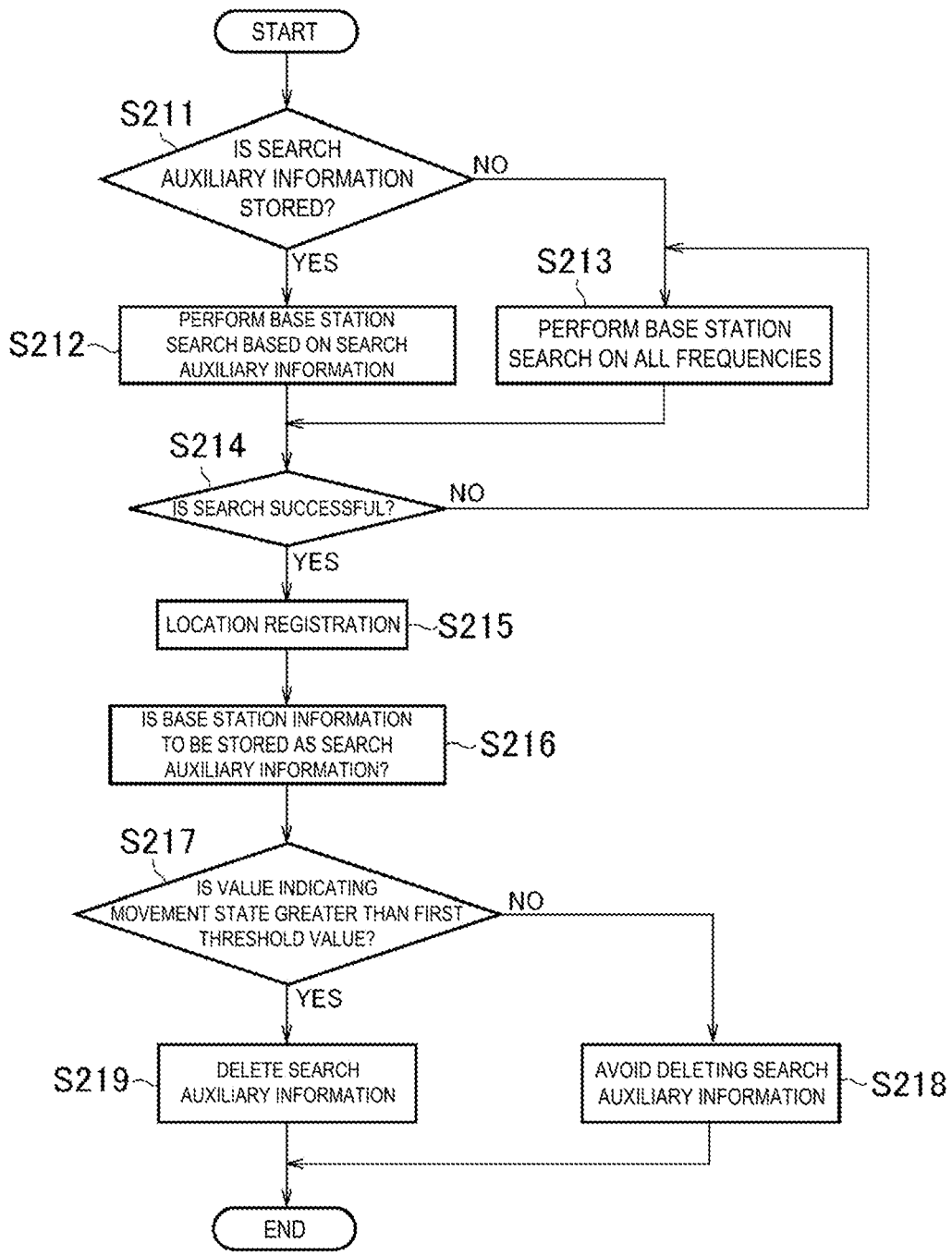
FIG. 7 is a diagram illustrating an operation example of a radio communication apparatus according to a second embodiment.

FIG. 7 is a diagram illustrating an operation example of the radio communication apparatus 100 according to the second embodiment.

The operation flow in FIG. 7 is initiated in a situation where the radio communication apparatus 100 needs to search for a base station used as a connection destination. Such a situation may include power on of the radio communication apparatus 100 and/or recovery from an out-of-service state.

As illustrated in FIG. 7, in step S211, the controller 130 checks whether the search auxiliary information is stored. Specifically, the controller 130 accesses the storage 140 or the SIM card 180, and checks whether the search auxiliary information is present in the storage 140 or the SIM card 180.

In a case where the search auxiliary information is stored (step S211: YES), then in step S212, the controller 130 performs the first base station search based on the search auxiliary information. For example, the controller 130 determines a frequency range to be searched based on the search auxiliary information, and attempts to receive radio signals from the base station 30 over the frequency range for a predetermined period of time.

In step S214, the controller 130 determines whether the first base station search has been successful. Specifically, the controller 130 checks whether a radio signal received by using the first base station search satisfies a predetermined criterion, and when reception of the radio signal satisfying the predetermined criterion is confirmed, the controller 130 determines that the search is successful. The predetermined criterion may be a criterion to be satisfied by the reception strength and/or reception quality of the radio signal.

On the other hand, in a case where the search auxiliary information is not stored (step S211: NO), or in response to determination of failure in the first base station search (step S214: NO), the controller 130 performs the second base station search on all the frequencies supported by the communicator 120 in step S213. Then, the controller 130 takes the processing to step S214.

In response to reception of a radio signal satisfying the predetermined criterion by using the first base station search or the second base station search (step S214: YES), the controller 130 performs a connection procedure on the base station 30 transmitting the radio signal, and performs a location registration procedure on the carrier network 40 to which the base station 30 belongs in step S215.

In response to reception of a plurality of radio signals satisfying the predetermined criterion, the controller 130 may perform a connection procedure on the base station 30 transmitting a radio signal with the highest reception strength or the highest reception quality.

In step S216, the controller 130 stores, as search auxiliary information, the base station information related to the base station 30 used as a connection destination during the location registration procedure. Specifically, the controller 130 stores the base station information in the storage 140 and/or the SIM card 180 as search auxiliary information. In a case where the search auxiliary information is already stored in the storage 140 and/or the SIM card 180, the controller 130 may overwrite the stored search auxiliary information.

In steps S217 to S219, the controller 130 determines whether to delete the stored search auxiliary information based on the movement state of the radio communication apparatus 100.

Specifically, in step S217, the controller 130 detects the movement state of the radio communication apparatus 100 (i.e., the controller 130 acquires the value indicative of the movement state). Then, the controller 130 compares the value indicating the movement state of the radio communication apparatus 100 with the first threshold value. In a case where the value indicating the movement state is less than or equal to the first threshold value (step S217: NO), the controller 130 determines not to delete the stored search auxiliary information and terminates the processing in step S218.

On the other hand, in a case where the value indicating the movement state is greater than the first threshold value (step S217: YES), then in step S219, the controller 130 determines to delete the stored search auxiliary information, deletes the stored search auxiliary information stored in the storage 140 and/or the SIM card 180, and terminates the processing.

In the above-described operation example, the condition for initiating the determination processing in step S217 is not referred to, but such determination may be made when the radio communication apparatus 100 is powered off. For example, such determination is made when the controller 130 detects a power off operation of the radio communication apparatus 100. The power off operation may be, for example, an operation of holding down a power supply button (not illustrated) of the radio communication apparatus 100, or a power off operation triggered by the remaining amount of charge in the battery 150 being less than or equal to a predetermined value.

The determination as described above may be made when the radio communication apparatus 100 transitions from the in-service state to the out-of-service state. For example, the determination as described above may be made when the controller 130 detects a transition of the radio communication apparatus 100 from the in-service state to the out-of-service state. Note that "out-of-service state" refers to a state in which the radio communication apparatus 100 is receiving no radio signal from the base station 30 or in which a radio signal from the base station 30 has significantly low received power (less than a threshold value), preventing the radio communication apparatus 100 from receiving radio communication services (data transmission and reception service, telephone call service, and the like) from the carrier network 40. The "out-of-service state" refers to a state in which a radio signal received from the base station 30 by the radio communication apparatus 100 is at or above a threshold value, allowing the radio communication apparatus to receive radio communication services (data transmission and reception service, telephone call service, and the like) from the carrier network 40.

Modification 1 of Second Embodiment

In the operation of the radio communication apparatus 100 in the above-described operation example, whether to delete the stored search auxiliary information is determined based on the movement state of the radio communication apparatus 100, but such determination may also be made taking into consideration the time elapsed since a transition from the in-service state to the out-of-service state.

In a case where a certain period of time has elapsed since the transition from the in-service state to the out-of-service state, even when the radio communication apparatus 100 is moving at low speed, for example, the first base station search is likely to fail when the base station search is performed in order to recover from the out-of-service state to the in-service state.

In Modification 1 of the second embodiment, even in a case where the value indicating the movement state of the radio communication apparatus 100 is less than or equal to the first threshold value during a transition from the in-service state to the out-of-service state (e.g., in a case where the radio communication apparatus 100 is moving at low speed), the controller 130 deletes the stored search auxiliary information when a certain period of time has elapsed since the transition from the in-service state to the out-of-service state (hereinafter simply referred to as the "transition").

In this manner, the search auxiliary information can be deleted that is likely to be useless when the next base station search is performed. Thus, the search can be started with the second base station search, with the first base station search omitted. As a result, the overall search time can be shortened and power consumption can be reduced.

Figure 8:
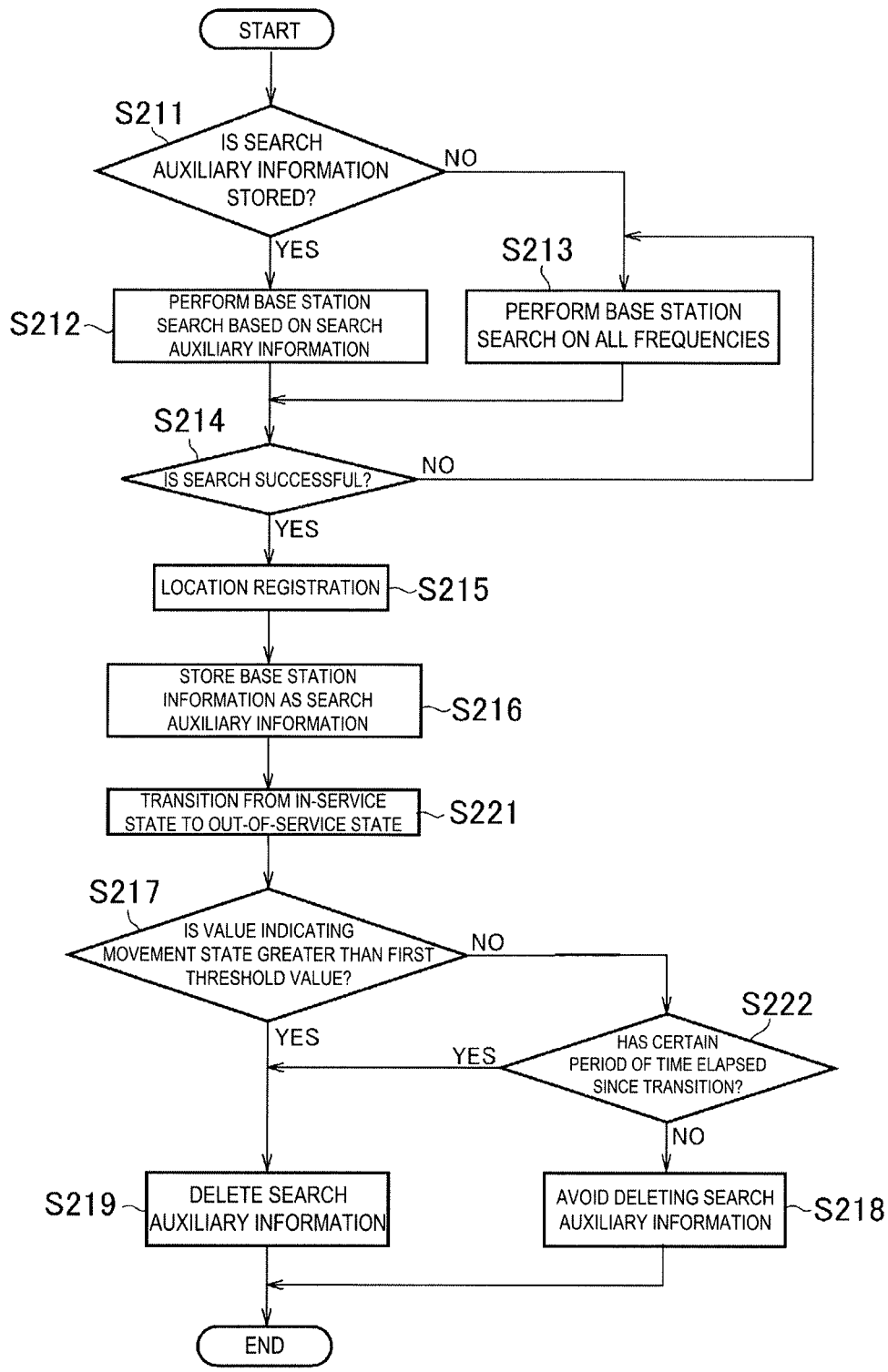
FIG. 8 is a diagram illustrating Modification 1 of operation of the radio communication apparatus according to the second embodiment.

FIG. 8 is a diagram illustrating Modification 1 of the operation of the radio communication apparatus according to the second embodiment. Here, differences from FIG. 7 will be described.

As illustrated in FIG. 8, the contents of processing in steps S211 to S216, S217, S218, and S219 are similar to the contents of processing in the identical steps in FIG. 7, but FIG. 8 differs from FIG. 7 in that operations related to the transition are performed in step S221 and step S222.

In step S221, the controller 130 detects a transition of the radio communication apparatus 100 and takes the processing to step S217.

In a case where the value indicating the movement state is less than or equal to the first threshold value (step S217: NO), the controller 130 determines whether a certain period of time has elapsed since the transition in step S222. In a case where certain period of time has elapsed since the transition (step S222: YES), in step S219, the controller 130 determines to delete the stored search auxiliary information and deletes the search auxiliary information stored in the storage 140 and/or the SIM card 180.

On the other hand, in a case where the certain period of time has not elapsed since the transition (step S222: NO), then in step S218, the controller 130 determines to delete the search auxiliary information and terminates the processing.

Here, a timer may be used to determine whether the certain period of time has elapsed since the transition (step S222). For example, the controller 130 activates the timer at a timing (step S221) when the controller 130 detects the transition of the radio communication apparatus 100, and in response to expiry of the timer, determines that the certain period of time has elapsed since the transition. Note that the timer may be stopped in a case where an operation for recovery to the in-service state is detected during timer activation. The timer value may be pre-configured or may be configured by the base station 30.

Modification 2 of Second Embodiment

In the operation of the radio communication apparatus 100 in the above-described operation example, whether to delete the search auxiliary information is determined based on the movement state of the radio communication apparatus 100, but such determination may be made taking into consideration the elapsed time from power off to power on.

In a case where the time elapsed from power off to power on exceeds a certain period of time, for example, even when the radio communication apparatus 100 is moving at low speed, the first base station search is likely to fail when the base station search associated with power on is performed.

In Modification 2 of the second embodiment, even in a case where the value indicating the movement state of the radio communication apparatus 100 at the time of power off is less than or equal to the first threshold value, the controller 130 deletes the stored search auxiliary information in a case where the elapsed time from power off to power on (hereinafter simply referred to as the "elapsed time") exceeds the certain period of time.

In this manner, the search auxiliary information can be deleted that is likely to be useless when the next base station search is performed. Thus, the search can be started with the second base station search, with the first base station search omitted. As a result, the overall search time can be shortened and power consumption can be reduced.

Figure 9:
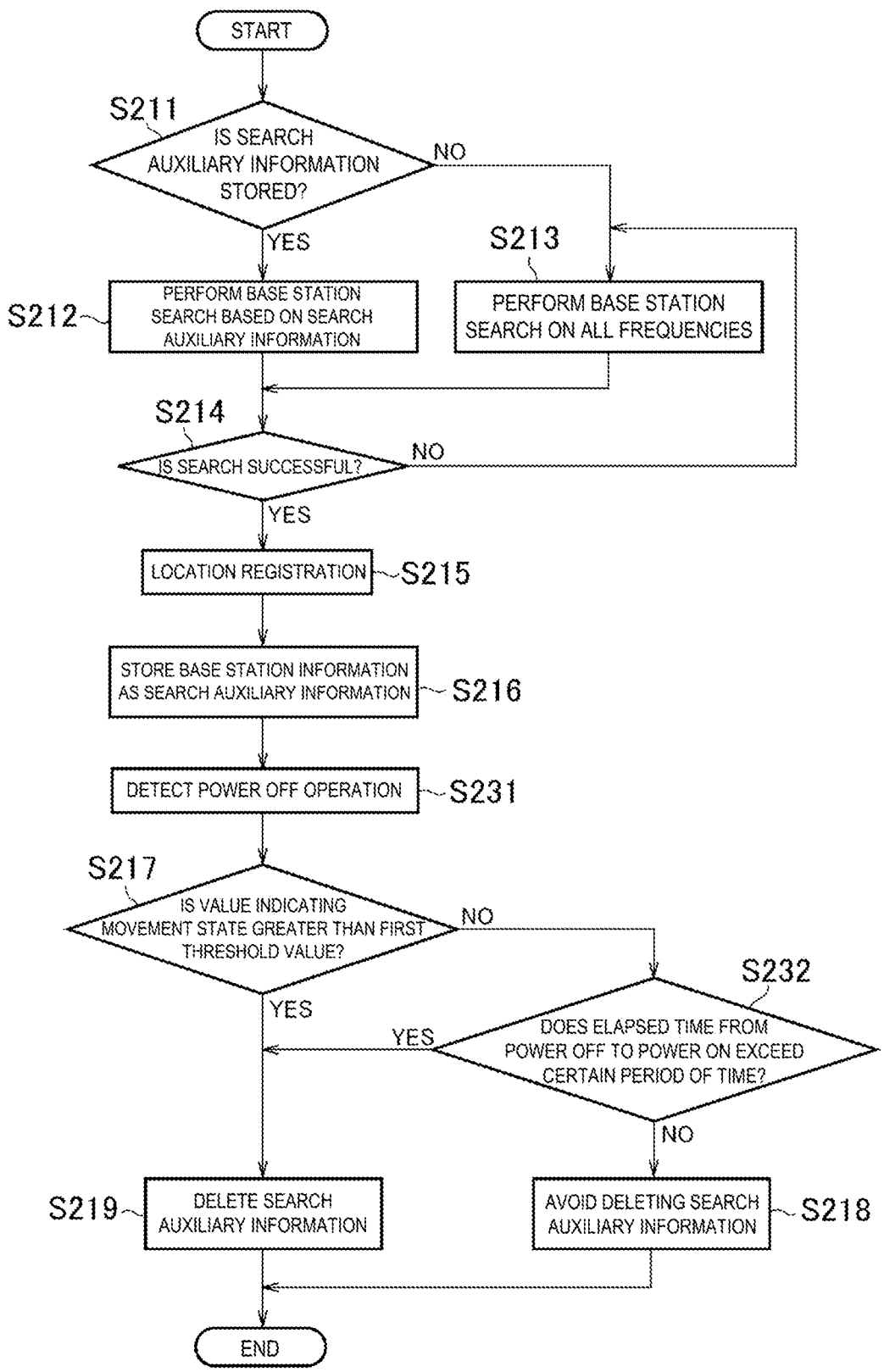
FIG. 9 is a diagram illustrating Modification 2 of the operation of the radio communication apparatus according to the second embodiment.

FIG. 9 is a diagram illustrating Modification 2 of the operation of the radio communication apparatus according to the second embodiment. Here, differences from FIG. 7 will be described.

As shown in FIG. 9, the contents of processing in steps S211 to S216, S217, S218, and S219 are similar to the contents of processing in the identical steps in FIG. 7, but FIG. 9 differs from FIG. 7 in that operations related to power off/on are performed in step S231 and step S232.

In step S231, the controller 130 detects power off (power off operation) of the radio communication apparatus 100 and takes the processing to step S217.

In a case where the value indicating the movement state is less than or equal to the first threshold value (step S217: NO), then in step S232, the controller 130 determines whether the elapsed time exceeds a certain period of time. In a case where the elapsed time is determined to exceed a certain period of time (step S232: YES), then in step S219, the controller 130 determines to delete the stored search auxiliary information and deletes the search auxiliary information stored in the storage 140 and/or the SIM card 180.

On the other hand, in a case where the elapsed time is determined not to exceed the certain period of time (step S232: NO), then in step S218, the controller 130 determines not to delete the search auxiliary information and terminates the processing.

Here, a timestamp may be used to determine whether the elapsed time exceeds the certain period of time. For example, the controller 130 records, as a timestamp T1, the timing at which power off of the radio communication apparatus 100 is detected, and records, as a timestamp T2, the timing at which power on is subsequently detected. In a case where the length of time indicated by the difference between T2 and T1 is greater than a fifth threshold value, the controller 130 determines that the elapsed time exceeds the certain period of time.

OTHER EMBODIMENTS

A program causing a computer to execute processing performed by the radio communication apparatus 100 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like. By integrating functional units (circuits) for performing processing performed by the radio communication apparatus 100, the radio communication apparatus 100 may be configured as a semiconductor integrated circuit (chip set, SoC).

Embodiments have been described above in detail with reference to the drawings, but specific configurations are not limited to those described above, and various design modifications can be made without departing from the gist of the present disclosure.

The invention claimed is:

1. A radio communication apparatus comprising:
a communicator; and
a controller configured to perform, in a case where search auxiliary information used to search for a base station used as a connection destination is stored, a first base station search based on the search auxiliary information, wherein
the controller is configured to perform a second base station search on all frequencies supported by the communicator in a case of failure in the first base station search or in a case where the search auxiliary information is not stored, and
the controller is configured to determine whether to store base station information related to the base station used as a connection destination, as the search auxiliary information, based on a movement state of the radio communication apparatus when location registration is performed via the base station used as the connection destination.

2. The radio communication apparatus according to claim 1, wherein
the controller is configured to
determine to store the base station information as the search auxiliary information in a case where a value indicating the movement state is less than or equal to a first threshold value, and
determine not to store the base station information as the search auxiliary information in a case where the value indicating the movement state is greater than the first threshold value, and
the movement state is at least one of a movement speed of the radio communication apparatus and an acceleration of the radio communication apparatus.

3. The radio communication apparatus according to claim 2, wherein
the controller is configured to determine not to store the base station information as the search auxiliary information in a case where a value indicating a radio wave condition in the radio communication apparatus during the location registration is less than a second threshold value, even in a case where the value indicating the movement state is equal to or less than the first threshold value.

4. The radio communication apparatus according to claim 2, wherein
the controller is configured to determine not to store the base station information as the search auxiliary information in a case where a value indicating a coverage range of the base station used as a connection destination is less than a third threshold value, even in a case where the value indicating the movement state is less than or equal to the first threshold value.

5. The radio communication apparatus according to claim 2, wherein the controller determines not to store the base station information as the search auxiliary information in a case where a length of an assumed time after the location registration is performed and before a next location registration is performed is greater than a fourth threshold value, even in a case where the value indicating the movement state is less than or equal to the first threshold value.

6. A method executed in a radio communication apparatus, the method comprising:
performing, in a case where search auxiliary information used to search for a base station used as a connection destination is stored, a first base station search based on the search auxiliary information;
performing, in a case of failure in the first base station search or in a case where the search auxiliary information is not stored, a second base station search on all frequencies supported by the communicator; and
determining whether to store base station information related to the base station used as a connection destination, as the search auxiliary information, based on a movement state of the radio communication apparatus when location registration is performed via the base station used as the connection destination.

7. A radio communication apparatus comprising:
a communicator; and
a controller configured to perform, in a case where search auxiliary information used to search for a base station used as a connection destination is stored, a first base station search based on the search auxiliary information, wherein
the controller is configured to perform a second base station search on all frequencies supported by the communicator in a case of failure in the first base station search or in a case where the search auxiliary information is not stored and
the controller is configured to store, as the search auxiliary information, base station information related to the base station used as a connection destination when location registration is performed via the base station used as the connection destination, and
the controller is configured to determine whether to delete the stored search auxiliary information, based on a movement state of the radio communication apparatus.

8. The radio communication apparatus according to claim 7, wherein
the controller is configured to perform the first base station search or the second base station search in response to power on of the radio communication apparatus or recovery of the radio communication apparatus from an out-of-service state to an in-service state, and
the controller is configured to make the determination in response to power off of the radio communication apparatus or a transition of the radio communication apparatus from the in-service state to the out-of-service state.

9. The radio communication apparatus according to claim 7, wherein
the controller is configured to
determine not to delete the stored search auxiliary information in a case where a value indicating the movement state is less than or equal to a first threshold value and
determine to delete the stored search auxiliary information in a case where the value indicating the movement state is greater than the first threshold value, and the movement state is at least one of a movement speed of the radio communication apparatus and an acceleration of the radio communication apparatus.

10. The radio communication apparatus according to claim 9, wherein
the controller is configured to delete the stored search auxiliary information in a case where a certain time has elapsed since the transition, even in a case where the value indicating the movement state is less than or equal to the first threshold value during the transition from the in-service state to the out-of-service state.

11. The radio communication apparatus according to claim 9, wherein
the controller is configured to delete the stored search auxiliary information in a case where an elapsed time from the power off to power on exceeds a certain period of time even in a case where the value indicating the movement state is less than or equal to the first threshold value at a time of the power off.

12. A method executed in a radio communication apparatus, the method comprising:
performing, in a case where search auxiliary information used to search for a base station used as a connection destination, a first base station search based on the search auxiliary information;
performing, in a case of failure in the first base station search or in a case where the search auxiliary information is not stored, a second base station search on all frequencies supported by the radio communication apparatus; and
storing, as the search auxiliary information, base station information related to the base station used as the connection destination when performing location registration via the base station used as a connection destination; and
determining whether to delete the stored search auxiliary information based on a movement state of the radio communication apparatus.

\* \* \* \* \*